United States Patent Office 3,399,205
Patented Aug. 27, 1968

3,399,205
O - (CYANO - PYRIDYL)O,O' DI - LOWER - AL-
KYL PHOSPHATE AND PHOSPHORO THIOATE
ESTERS AND DERIVATIVES THEREOF
Raymond H. Rigterink, Midland, Mich., assignor to The
Dow Chemical Company, Midland, Mich., a corpora-
tion of Delaware
No Drawing. Continuation-in-part of application Ser. No.
375,369, June 15, 1964. This application Sept. 21, 1967,
Ser. No. 669,395
9 Claims. (Cl. 260—294.8)

ABSTRACT OF THE DISCLOSURE

Cyanopyridyl phosphorus compounds having the formula.

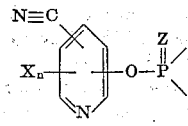

in which Z represents oxygen or sulfur; X represents bromo or chloro; R represents loweralkoxy; R' repre-sents loweralkoxy, amino, or loweralkylamino; and n represents an integer of from 0 to 3, both inclusive, are claimed. The compounds are useful as parasiticides.

The present invention is directed to cyanopyridyl phosphorus compounds having the formula

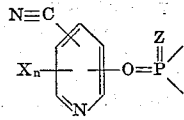

in which Z represents oxygen or sulfur; X represents bromo or chloro; R represents loweralkoxy; R' repre-sents loweralkoxy, amino, or loweralkylamno; and n represents an integer of from 0 to 3, both inclusive. In the present specification and claims, the terms "lower-alkoxy" and "loweralkyl" refer to radicals being of from 1 to 4, inclusive, carbon atoms; and the term "low-eralkylamino" is inclusive of both mono- and dilower-alkylamino radicals.

This application is a continuation-in-part of U.S. pat-ent application Ser. No. 375,369, filed June 15, 1964, now abandoned.

These compounds are crystalline solid or viscous ma-terials which are somewhat soluble in many common organic solvents and of very low solubility in water. The compounds are useful as parasiticides and are especially adapted to be employed as active toxicants in composi-tions for the control, and, in particular, for the selective control, of a number of arachnid, insect, helminth, bac-terial and fungal organisms and aquatic animals; such as cockroaches, beetles, mites, ticks, worms, Southern armyworms, aphids, flies, mosquites, cattle grubs, screw worms, trash fish, snails, ascarids, nematodes, round-worms and plum curculio.

The novel compounds of the present invention are prepared by any one of several methods. In a preferred method, the compounds are prepared by reacting a phos-phorochloridate or phosphorochloridothioate having the formula

with an alkali metal salt or a teriaryamine salt of a cy-anopyridinol, having the formula

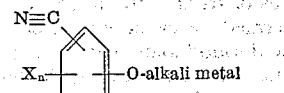

or

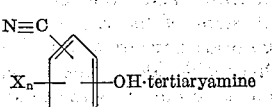

respectively.

The reaction conveniently is carried out in an inert organic liquid such as acetone, dimethylformamide, car-bon tetrachloride, chloroform, benzene, toluene, isobutyl methyl ketone, or methylene dichloride. The amounts of the reactants to be employed are not critical, some of the desired product being obtained when employing the reactants in any amounts. In the preferred method of op-eration, good results are obtained when employing sub-stantially equimolecular proportions of the cyanopyri-dinol salt and phosphorochloridate or phosphorochlori-dothioate. The reaction takes place smoothly at a reac-tion temperature of from 0° to 100° C., with the produc-tion of the desired product and a chloride byproduct which appears as an alkali metal chloride or as a tertiary amine hydrochloride salt. In carrying out the reaction, the reactants are mixed and contacted together in any convenient fashion, and the resulting mixture maintained for a period of time in the reaction temperature range to complete the reaction. Following the completion of the reaction, the reaction mixture is washed with water and any organic reaction medium removed by fractional dis-tillation under reduced pressure to obtain the desired product as a residue. This product can be further purified by conventional procedures such as washing with water and dilute aqueous alkali metal hydroxide, solvent ex-traction and recrystallization.

In an alternative procedure, those compounds of the present invention in which R' represents amino or lower-alkylamino can be prepared by reacting a phosphorodi-chloridate or phosphorodichloridothioate having the for-mula

with an alkali metal salt or tertiaryamine salt of a cy-anopyridinol, as previously defined, to form an inter-mediate cyanopyridyl phosphorochloridate or phosphoro-chloridothioate having the structure

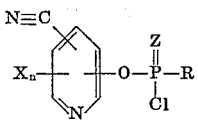

This intermediate is thereafter reacted with an amino compound such as ammonia or a loweralkylamine to pro-duce the desired product wherein R' represents amino or lower-alkylamino. The reaction of phosphorodichloridate or phosphorodichloridothioate with the salt of the cyano-pyridinol and the reaction of the intermediate with the amino compound are carried out in a reaction medium such as benzene, acetone, dimethylformamide, chloro-form, carbon tetrachloride, or methylene chloride. Con-veniently, the reactions are carried out sequentially in the same reaction medium. Good results are obtained when employing substantially equimolecular proportions of the phosphorodichloridate or phosphorodichloridothioate and cyanopyridinol salt and at least two molecular proportions of amino compound. The reaction with the cyanopyridinol salt is somewhat exothermic and is carried out at temperatures of from −50° to 25° C. The reaction between the intermediate cyanopyridyl phosphorochloridate or phosphorochloridothioate and the amino compound is also exothermic and takes place at the temperature range of from −10° to 60° C. The temperatures can be controlled by regulating the rate of mixing and contacting the reactants together and by external cooling. The byproduct in both steps of the reaction is chloride. In the first step, the chloride appears as alkali metal chloride or tertiaryamine hydrochloride. In the second step, the chloride appears and is removed as the hydrochloride salt of the amine or ammonia reactant. The desired product can be separated in accordance with the conventional procedures as previously described.

In an alternative procedure, the compounds of the present invention can be prepared by reacting phosphorus oxychloride or phosphorus thiochloride with a cyanopyridinol salt as previously defined to form an intermediate cyanopyridyl phosphorodichloridate or phosphorodichloridothioate. Good results are obtained when employing substantially equimolecular proportions of the reactants. The reaction takes place readily at temperatures of from −50° to 80° C. with the production of the desired product and halide of reaction. The intermediate is thereafter reacted with one or two alkali metal loweralkanolate reactants of the formula alkali metal—R or, when R' in the desired product represents amino or loweralkylamino, with one alkali metal loweralkanolate reactant and with an amino compound such as ammonia or a loweralkylamine, to produce the desired compound either as a diester or triester product. The reaction takes place at temperatures at which chloride of reaction is formed. This chloride appears in the reaction mixture as alkali metal chloride, or, when an amino compound is employed as reactant, as the hydrochloride salt of the amino compound. Good results are obtained when operating at temperatures of from −10° to 60° C. and employing substantially stoichiometric amounts of the reactants. Upon completion of the reaction, the desired product is separated by conventional procedures as previously described.

The reaction, of whatever sort, by which a cyanopyridyloxy moiety is introduced into a compound of the present invention, occurs at the cyanopyridinol hydroxy site, or at the oxymetal or hydroxylamine site of the derivative thereof, and other portions of the canopyridyloxy moiety remain essentially unchanged. Thus the isomery of the cyanopyridyloxy portion of the present compounds can be controlled by choice of the isomery of the starting cyanopyridyl compound.

The desirable properties of the present products are inherent in the pure compounds; and when highly selective properties are to be relied upon the purified compounds will be preferred. However, for many appications, wherein low cost is a major consideration, the reaction mixture wherein the product was prepared can be used with no steps whatsoever of separating or purifying product compounds therefrom, since byproducts of reaction are often unobjectionable. Likewise, incompletely purified products can be used, when desired.

A preferred embodiment according to the present invention constitutes those subject compounds wherein the cyanopyridyl moiety is a radical of the following formula:

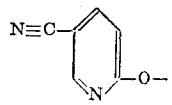

A preferred sub-group of the subject compounds are those compounds of the formula

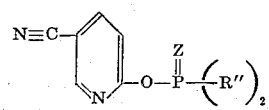

where R″ represents methoxy or ethoxy. The compounds of this preferred sub-group admit of ready synthesis and exhibit an excellent combination of the properties possessed by the subject compounds generally.

The following examples illustrate the best mode now known by the inventor for practicing the present invention and will enable those skilled in the art to practice the invention.

Example 1.—O-(5-cyano-2-pyridyl) O,O-diethyl phosphorothioate 5-cyano-2-pyridinol (7.0 grams; 0.058 mole), anhydrous sodium carbonate (6.5 grams; 0.058 mole), and 100 milliliters of dimethylformamide are stirred together at room temperature to produce a liquid medium containing the sodium salt of the 5-cyano-2-pyridinol. O,O-diethyl phosphorochloridothioate (10.5 grams; 0.058 mole) is added in one portion thereto with stirring. Thereafter, the resulting reaction mixture is heated to a temperature of about 60° C. and maintained at a temperature of 60°–65° C. for 1 hour with stirring to complete the reaction. The reaction mixture is then filtered and the reaction medium removed from the filtrate by distillation under reduced pressure to obtain the O-(5-cyano-2-pyridyl) O,O-diethyl phosphorothioate product as a residue. The product residue is dispersed in a liquid consisting of 100 milliliters of benzene and 50 milliliters of water, the resulting dispersion filtered, and the benzene portion thereof separated and washed twice with 50 milliliter portions of water. Water is removed from the washed portion over a dehydrating agent, the dried said portion filtered, and the solvent removed from the filtrate by evaporation under subatmospheric pressure to separate the product. The product is purified by mixing it with a quantity of petroleum ether boiling at 60–70° C., the mixture heated to boiling and thereafter cooled, traces of water removed from the cooled mixture over a dehydrating agent, the dried mixture filtered, and the petroleum ether removed by evaporation under subatmospheric pressure. The purified product is a liquid material having a refractive index $n_D^{25}$ 1.5238.

Example 2.—O-(2-cyano-3-pyridyl) O,O-diethyl phosphorothioate

In procedures essentially identical with those employed in Example 1, O-(2-cyano-3-pyridyl) O,O-diethyl phosphorothioate is prepared. The product has a molecular weight of 272.3, is a liquid material; and has a refractive index $n_D^{25}$ 1.5160.

Example 3.—O-(6-cyano-3-pyridyl) O-isobutyl ethylphosphoramidate 6-cyano-3-pyridinol (6.0 grams; 0.05 mole) and sodium carbonate (5.3 grams; 0.05 mole) are mixed together in 200 milliliters of isobutyl methyl ketone as solvent. Thereafter, the mixture is cooled to about −40° C. and O-isobutyl phosphorodichloridate (9.6 grams; 0.05 mole) added all at once with stirring. Stirring is continued for one hour allowing the temperature to rise to 25° C. As a result of these operations, there is prepared a liquid mixture containing the intermediate O-isobutyl O-(6-cyano-3-pyridyl) phosphorochloridate; this liquid mixture is cooled to a temperature of about 0° C. Ethylamine (4.5 grams; 0.1 mole) is then added portionwise with stirring and cooling to the said mixture; the addition is carried out in 10 minutes and at a temperature of from 0° to 10° C. Stirring is then continued for one hour and the temperature allowed to rise to 25° C. in order that the reaction be completed. The reaction mixture is thereafter washed with water and the reaction medium removed by fractional distillation under reduced pressure to obtain the O-isobutyl O-(6-cyano-3-pyridyl) ethylphosphoramidate product having a molecular weight of 283.

In similar manners, other compounds representative of the present invention are prepared as follows:

From O-n-butyl diethylphosphormidochloridate and the sodium salt of 3-cyano-2-pyridinol, O-(3-cyano-2-pyridyl) O-n-butyl diethylphosphoramidate product having a molecular weight of 309.3.

From O-isopropyl methylphosphoramidochloridate and the sodium salt of 5-cyano-3-bromo-2-pyridinol, O-(5-cyano-3-bromo-2-pyridyl) O-isopropyl methylphosphoramidate product having a molecular weight of 334.1. The sodium salt of 5-cyano-3-bromo-2-pyridinol is prepared by reacting 5-cyano-3-bromo-2-pyridinol, a compound melting at 252–257° C., with sodium hydroxide.

From O-methyl di-n-butylphosphoramidochloridothioate and the sodium salt of 4-cyano-2-pyridinol, O-(4-cyano-2-pyridyl) O-methyl di-n-butylphosphoramidothioate product having a molecular weight of 341.4.

From O,O-diethyl phosphorochloridothioate and the sodium salt of 5-cyano-3,6-dibromo-2-pyridinol, O-(5-cyano-3,6-dibromo-2-pyridyl) O,O-diethyl phosphorothioate product having a molecular weight of 429.2.

From O,O-dimethyl phosphorochloridate and the sodium salt of 5-cyano-2-pyridinol, O-(5-cyano-2-pyridyl) O,O-dimethyl phosphate product having a molecular weight of 228.2.

From O,O-diethyl phosphorochloridothioate and the sodium salt of 5-cyano-3-chloro-2-pyridinol, O-(5-cyano-3-chloro-2-pyridyl) O,O-diethyl phosphorothioate product. The product is a viscous liquid having a refractive index $n_D^{25}$ of 1.5310. The sodium salt of 5-cyano-3-chloro-2-pyridinol is prepared by reacting 5-cyano-3-chloro-2-pyridinol, a compound melting at 241–245° C., with sodium carbonate.

From O-n-propyl isobutylphosphoramidochloridothioate and the sodium salt of 6-cyano-2-pyridinol, O-(6-cyano-2-pyridyl) O-n-propyl isobutylphosphoramidothioate product having a molecular weight of 301.4.

From O,O-diethyl phosphorochloridothioate and the sodium salt of 6-cyano-3,5-dichloro-2-pyridinol, O-(6-cyano-3,5-dichloro-2-pyridyl) O,O-diethyl phosphorothioate product having a molecular weight of 341.2.

From O-n-butyl O-methyl phosphorochloridothioate and the sodium salt of 3-cyano-5-chloro-4-pyridinol, O-(3-cyano-5-chloro-4-pyridyl) O-n-butyl O-methyl phosphorothioate product having a molecular weight of 320.7.

From O,O-diethyl phosphorochloridate and the sodium salt of 5-cyano-2-pyridinol, O-(5-cyano-2-pyridyl) O,O-diethyl phosphate product having a molecular weight of 256.2 and a refractive index of $n_D^{25}$ 1.4862.

From O-isopropyl methylphosphoramidochloridothioate and the sodium salt of 5-cyano-2-pyridinol, O-(5-cyano-2-pyridyl) O-isopropyl methylphosphoramidothioate product having a molecular weight of 271.3.

From O,O-di-sec-butyl phosphorochloridate and the sodium salt of 3-cyano-5-bromo-2-pyridinol, O-(3-cyano-5-bromo-2-pyridyl) O,O-di-sec-butyl phosphate product having a molecular weight of 391.2.

From O,O-di-n-propyl phosphorochloridothiate and the sodium salt of 5-cyano-2-pyridinol, O-(5-cyano-2-pyridyl) O,O-di-n-propyl phosphorothioate product having a molecular weight of 300.3.

From O-ethyl phosphorodichloridate, the sodium salt of 2-cyano-3-pyridinol, and ammonia, O-(2-cyano-3-pyridyl) O-ethyl phosphoramidate product having a molecular weight of 227.2.

From O,O-dimethyl phosphorochloridothioate and the sodium salt of 5-cyano-2-pyridinol, O-(5-cyano-2-pyridyl) O,O-dimethyl phosphorothioate product having a molecular weight of 244.2 and melting at 85–86° C. In a representative preparation, the product was found to have an actual nitrogen content of 11.55 percent as compared to a theoretical nitrogen content of 11.45 percent.

From O,O-di-sec-butyl phosphorochloridate and the sodium salt of 4-cyano-3-pyridinol, O-(4-cyano-3-pyridyl) O,O-di-sec-butyl phosphate product having a molecular weight of 312.3.

From O,O-dimethyl phosphorochloridothioate and the sodium salt of 5-cyano-3-pyridinol, O-(5-cyano-3-pyridyl) O,O-dimethyl phosphorothioate product having a molecular weight of 234.2

From O-n-propyl sec-butyl-phosphoramidochloridothioate and the sodium salt of 5-cyano-3-chloro-2-pyridinol, O-(5-cyano-3-chloro-2-pyridyl) O-n-propyl sec-butylphosphoramidothioate product having a molecular weight of 347.8.

From O-n-propyl dimethylphosphoramidochloridothioate and the sodium salt of 2-cyano-4-pyridinol, O-(2-cyano-4-pyridyl) O-n-propyl dimethylphosphoramidothioate product having a molecular weight of 285.3.

From O-methyl phosphoramidochloridate and the sodium salt of 2-cyano-6-bromo-3-pyridinol, O-(2-cyano-6-bromo-3-pyridyl) O-methyl phosphoramidate product having a molecular weight of 292.

From O,O-dimethyl phosphorochloridate and the sodium salt of 3-cyano-4-pyridinol, O-(3-cyano-4-pyridyl) O,O-dimethyl phosphate product having a molecular weight of 228.2.

From O-methyl methylphosphoramidochloridothioate and the tertiary-amine salt of 5-cyano-2-pyridinol, O-(5-cyano-2-pyridyl) O-methyl methylphosphoramidothioate product melting at 69–71° C.

From O,O-diethyl phosphorochloridothioate and the sodium salt of 3-cyano-4-pyridinol, O-(3-cyano-4-pyridyl) O,O-diethyl phosphorothioate product having a molecular weight of 272.3.

From O,O-diethyl phosphorochloridothioate and the sodium salt of 5-cyano-3,6-dichloro-2-pyridinol, O-(5-cyano-3,6-dichloro-2-pyridyl) O,O-diethyl phosphoro-thioate product having a molecular weight of 341.2.

From O-ethyl O-methyl phosphorochloridate and the sodium salt of 2-cyano-4-pyridinol, O-(2-cyano-4-pyridyl) O-ethyl O-methyl phosphate product having a molecular weight of 242.2.

From O,O-dimethyl phosphorochloridate and the sodium salt of 5-cyano-3,4,6-trichloro-2-pyridinol, O-(5-cyano-3,4,6-trichloro-2-pyridyl) O,O-dimethyl phosphate product having a molecular weight of 331.5.

From O-isobutyl phosphoramidochloridate and the sodium salt of 2-cyano-4-pyridinol, O-(2-cyano-4-pyridyl) O-isobutyl phosphoramidate product having a molecular weight of 255.2.

From O,O-dimethyl phosphorochloridothioate and the sodium salt of 5-cyano-2,4,6-tribromo-3-pyridinol, O-(5-cyano-2,4,6-tribromo-3-pyridyl) O,O-dimethyl phosphorothioate product having a molecular weight of 480.9

The compounds of the present invention are useful as parasiticides and parasite repellants in a variety of household, industrial, and agricultural operations. In particular, the compounds are useful for the kill and control of arthropod pest organisms, such as crustaceans, including sow bugs fiddler crabs; arachnids, including spiders, mites, and ticks; myriapods, including centipedes; and insects.

In particular, the compounds of the present invention can be employed to give a quick inactivation of arthropod organisms; this is spoken of as a "quick knockdown". Also, the subject compounds exhibit residual activity over long periods of time following utilization in areas the character of which is determined largely by the presence of inert objects, such as wood or wood products, fabrics, metal or metallic materials, plastic materials, and the like. Because of this excellent residual activity and because of the "quick knockdown", the subject compounds are particularly suitable for the control, inside houses, barns, warehouses, public buildings, and the like, of arthropod pests, including cockroaches, such as the German cockroach, American cockroach, and brown-banded cockroach; beetles, such as the black-carpet beetle, confused flour beetle, sawtooth grain beetle, and larder beetle; spiders, silverfish; bedbugs; fleas, such as those on bedding used by household pets, and flea larvae; mosquitos; box-elder bugs; spiders; mites; ants, centipedes; and flies, such as the common housefly. The subject compounds exhibit negligible mammalian toxicity at rates which are highly effective for such indoor control of arthropod pests and thus are particularly adapted for such employment.

The new cyanopyridyl phosphorus compounds are also very effective for the control of the many arthropod organisms found on the root or aerial portions of growing plants, including aphids, mites, plant pathogens, and chewing and sucking insects, such as Southern army worm (*Prodenia eridania*), California red scale (*Aonidiella aurantii*), Mexican bean beetle (*Epilachna varivestis*), two-spotted spider mite (*Tetranychus bimaculatus*), and bean aphid (*Aphis fabae*).

In contrast with the excellent residual activity of the subject compounds in contact with essentially inert objects, the subject compounds, when applied to plants, plant parts, and their habitats to protect the plants from the attack of arthropod organisms, exhibit residual control of the organisms over only a relatively brief period of time. Thus, plants treated with one or more of the present cyanopyridyl phosphorus compounds are found shortly thereafter to be free from the compounds and from substances identifiable as residues of the compounds.

The new compounds can also be included in inks, adhesives, soaps, polymeric materials, cutting oils or in oil or latex paints. Also, the present compounds can be distributed in textiles, cellulosic materials, or in grains, or can be employed in the impregnation of wood and lumber. Additionally, they can be applied to seeds. In yet other procedures, the cyanopyridyl phosphorus compounds can be vaporized or sprayed or distributed as aerosols into the air, or onto surfaces in contact with the air. In such applications, the compounds manifest the useful properties herinbefore described.

The methods of the present invention comprise contacting an arthropod with an inactivating amount of one of the present cyanopyridyl phosphorus compounds. Contacting can be effected by application of the compound to habitat of arthropods. Representative habitats include soil, air, water, food, vegetation, inert objects, stored matter such as grains, other animal organisms, and the like. The inactivtaion can be lethal, immediately, or with delay, or can be a sub-lethal one in which the inactivated arthropod is not able to carry out one or more of its normal life processes. This latter situation prevails when one of the systems of the arthropod, typically the nervous system, is seriously disturbed. A preferred embodiment of the present invention comprises the employment of the present method for the kill and control of insects and arachnids; such employment gives excellent results, particularly in control of insects and arachnids that have developed resistance against other pest-control substances.

The inactivation of an arthropod by the application of an inactivating amount of one of the cyanopyridyl phosphorus compounds is critical to the method of the present invention. The cyanopyridyl phosphorus compound can sometimes be employed in unmodoified form. Frequently, however, the desirable properties of such compound can be utilized only when the compound is modified by the employment with it of a pesticidal adjuvant. Thus, for example, the present compounds are of very low solubility in water but are relatively soluble in oils, including plant essential oils. Accordingly, the application of the pure compound, even by the use of highly sophisticated techniques, to the surface of a plant, commonly results in its dispersion and loss in surface waxes or essential oils; or, in the common situation of early morning application when the plant is wet with dew, may result in run-off which leaves the plant with little or no applied product. Also, in aquatic settings, the desirable properties of the compounds can usually be utilized only when the compounds are modified by the employment of a pesticidal adjuvant. Moreover, the pure compound is quickly attacked in outdoor situations by sunlight and air, whereas, incorporated in a pesticidal adjuvant the compound often derives protection from such influences. Therefore, the practical employment of the beneficial utilities of the present compounds often requires that the compound be composited with one or more pesticidal adjuvant substances, and the resulting compositions are comprehended with the present invention.

The composition can be a liquid or a dust; and the adjuvant employed can be any one or a plurality of materials including aromatic solvents, petroleum distillates, water, or other liquid carriers, propellant substances, surface-active dispersing agents, light absorbers, and finely divided carrier solids. In such compositions, the adjuvant cooperates with the cyanopyridyl phosphorus compound so as to obtain a composition to facilitate the method of the present invention, and to obtain an improved result. The use of either a surface-active dispersing agent or a finely divided carrier solid and the use of both a surface-active dispersing agent and a finely divided carrier solid, simultaneously, constitute preferred embodiments of the method of the present invention. Another preferred embodiment of the present invention is a composition comprising one or more of the cyanopyridyl phosphorus compounds, an organic liquid as a solvent and carrier therefor, and a propellant material. Numerous other embodiments will become available to those skilled in the art in view of the teachings set forth hereinbelow.

The exact concentration of one or more cyanopyridyl phosphorus compounds in a composition thereof with one or a plurality of adjuvants can vary; it is necessary only that one or more cyanopyridyl phosphorus compounds be present in such amount as to make possible the application of an inactivating dosage. In many situations, a composition comprising .0000001 percent of one, or a total of more than one, of the cyanopyridyl phosphorus compounds is effective for the administration of an inactivating amount thereof to arthropod pest organisms. In other procedures, compositions comprising a lesser amount, such as .00000005 percent of one, or more than one, of the cyanopyridyl phosphorus compounds, or a greater amount, such as 0.05 percent of one, or more than one, of the cyanopyridyl phosphorus compounds, are effective for the inactivation of arthropod organisms. In still other operations, compositions containing from 0.5 to 98 percent by weight of one cynaopyridyl phosphorus compound, or from 0.5 to 98 percent of a total of more than one cyanopyridyl phosphorus compound, are conveniently employed. Such compositions are adapted to be employed as treating compositions and applied to parasites and to their habitats, or to be employed as concentrates and subsequently diluted with aditional adjuvant to produce ultimate treating compositions.

When combining the present toxicants with adhesives, detergents, cutting oils, paints, polymeric materials, textiles, paper, and other similar products, good results are obtained when the compounds are incorporated in such products in the amount of 0.005 to 0.1 percent by weight, and when heavier applications are needed in the amount of from 0.1 to 2.0 percent by weight. When one or more than one of the present toxicants is combined with wood, excellent results are obtained when the toxicant compound or compounds are incorporated by conventional treatment of the wood in the amount of from 0.00005 to 0.5 pounds per cubic foot of wood, depending on depth of penetration, exposure, and the like.

In the preparation of dust compositions, the cyanopyridyl phosphorus product can be compounded with any of the finely divided carrier solids such as pyrophyllite, diatomaceous earth, gypsum and the like. In such operations, the finely divided carrier is ground or mixed with one or more of the cyanopyridyl phosphorus compounds, as active agent, or wetted with a solution of the active agent in a volatile organic solvent. Similarly, dust compositions containing the cyanopyridyl phosphorus product can be similarly compounded from various of the solid dispersing agents, such as fuller's earth, attapulgite and other clays. These dust compositions can be employed as treating compositions or can be employed as concentrates and subsequently diluted with additional solid dispersing agent or with pyrophyllite, diatomaceous earth, gypsum and the like to obtain the desired amount of active agent in a treating composition. Also, such dust compositions can be dispersed in water, with or without the aid of surfactant, to form spray mixtures.

Further, one of the cyanopyridyl phosphorus compounds or a dust concentrate composition containing such compound can be incorporated in intimate mixture with surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

In the preparation of liquid compositions, the cyanopyridyl phosphorus product can be compounded with a suitable water-immiscible organic liquid and surface active dispersing agent to produce an emulsifiable liquid concentrate which can be further diluted with water and oil to form spray mixtures in the form of oil-in-water emulsions. In such compositions, the carrier comprises an aqueous emulsion, that is, a mixture of water-immiscible solvent, emulsifying agent and water. Preferred dispersing agents to be employed in these compositions are oil-soluble and include the non-ionic emulsifiers such as the polyoxyethylene derivatives of sorbitan esters, complex ether alcohols and the like. However, oil-soluble ionic emulsifying agents such as mahogany soaps can also be used. Suitable organic liquids to be employed in the compositions include petroleum oils and distillates, toluene, liquid halohydrocarbons and synthetic organic oils.

When operating in accordance with the present invention, the cyanopyridyl phosphorus product or a composition containing the product is applied to the pests to be controlled directly, or by means of application to a portion or portions of their habitat in any convenient manner, for example, by means of hand dusters or sprayers or by simple mixing with the food to be ingested by the organisms. Application to the foliage of plants is conveniently carried out with power dusters, boom sprayers and fog sprayers. In such foliar applications, the employed compositions should not contain any appreciable amounts of any phytotoxic diluents. In large scale operations, dusts, or low-volume sprays can be applied from an airplane. The present invention also comprehends the employment of compositions comprising one of the cyanopyridyl phosphorus compounds, an adjuvant, and one or more other biologically active materials, such as insecticides, fungicides, miticides, bactericides, nematocides, and the like, or one or more synergistic materials.

A preferred and especially convenient matter for the application of one or more of the present products comprises the use of a self-pressurized pack formulation which can be used, for example, as a space or surface spray. Such a formulation can comprise one or more of the cyanopyridyl phosphorus compounds, an organic liquid as a solvent and vehicle therefor, and a propellant material which can be a condensed and compressed gas or a substance which, at room temperature, is a gas under atmospheric pressure but which liquefies under superatmospheric pressure. Where the propellant material is of the latter type, the self-pressurized pack formulation is often spoken of as an aerosol. Representative propellants include propane, butane, nitrogren, and the fluorinated hydrocarbons, such as dichlorodifluoromethane and trichlorofluoromethane. Generally, the propellant constitutes from 25 to 95 percent by weight of the total self-pressurized pack. As vehicle, there can be employed any liquid in which the desired amount of product is capable of being dispersed; preferred vehicles include petroleum distillates, kerosene, and methylene chloride. The self-pressurized pack formulation can also include other materials, such as other biologically active agents or synergists. For further discussion of the use of self-pressurized pack formulations, see U.S. Patents 1,892,750 and 2,321,023.

The control of pest organisms by the contacting thereof with one or more of the new cyanopyridyl phosphorus compounds is illustrated by the following examples.

Example 4

Aqueous compositions, each containing one of the present cyanopyridyl phosphorus compounds, are prepared as follows:

4 parts by weight of one of the cyanopyridyl phosphorus compounds, 0.08 part of sorbitan trioleate (Span 85) and 0.02 part of a sorbitan monolaurate polyoxyethylene derivative (Tween 80) are dispersed in 40 milliliters of acetone to produce a concentrate composition in the form of a water-dispersible liquid. This concentrate composition is dispersed in water to provide aqueous compositions containing varying amounts of the cyanopyridyl phosphorus compound employed.

In this manner, aqueous compositions are separately prepared with

O-(5-cyano-2-pyridyl) O,O-diethyl phosphorothioate;
O-(2-cyano-3-pyridyl) O,O-diethyl phosphorothioate;
O-(6-cyano-3-pyridyl) O-isobutyl ethylphosphoramidate;
O-(3-cyano-2-pyridyl) O-n-butyl diethyl phosphoramidate;
O-(4-cyano-2-pyridyl) O-methyl di-n-butylphosphoramidothioate;
O-(5-cyano-2-pyridyl) O,O-dimethyl phosphate;
O-(6-cyano-2-pyridyl) O-n-propyl isobutylphosphoramidothioate;
O-(5-cyano- 2-pyridyl) O,O-diethyl phosphate;
O-(5-cyano-2-pyridyl) O,O-dimethyl phosphorothioate;
O-(5-cyano-2-pyridyl) O-isopropyl methylphosphoramidothioate;
O-(5-cyano-2-pyridyl) O,O-di-n-propyl phosphorothioate;
O-(2-cyano-3-pyridyl) O-ethylphosphoramidate;
O-(4-cyano-3-pyridyl) O,O-di-sec-butylphosphate;
O-(5-cyano-3-pyridyl) O,O-dimethyl phosphorothioate;
O-(5-cyano-2-pyridyl) O-methyl methylphosphoramidothioate;
O-(6-cyano-3,5-dichloro-2-pyridyl) O,O-diethyl phosphorothioate;
O-(5-cyano-3-chloro-2-pyridyl) O,O-diethyl phosphorothioate;
O-(5-cyano-2-bromo-3-pyridyl) O-isopropyl methylphosphoramidate;
O-(3-cyano-5-chloro-4-pyridyl) O-n-butyl O-methyl phosphorothioate;
O-(3-cyano-5-bromo-2-pyridyl) O,O-di-sec-butyl phosphate;
O-(5-cyano-3-chloro-2-pyridyl) O-n-propyl sec-butylphosphoramidothioate;
O-(2-cyano-6-bromo-3-pyridyl) O-methyl phosphoramidate;
O-(5-cyano-3,6-dichloro-2-pyridyl) O,O-diethyl phosphorothioate;
O-(5-cyano-3,4,6-trichloro-2-pyridyl) O,O-dimethyl phosphate;

O-(5-cyano-2,4,6-tribromo-3-pyridyl) O,O-dimethyl phosphorothioate; and

O-(5-cyano-3,6-dibromo-2-pyridyl) O,O-diethyl phosphorothioate.

Example 5

In further operations, aqueous compositions, each containing one of the present cyanopyridyl phosphorus compounds, are prepared as follows.

A known quantity of one of the cyanopyridyl phosphorus compounds is mixed with a quantity of water, a quantity of an alkyl aryl sulfonate (Nacconol NR), and a quantity of a substituted benzoid alkyl sulphonic acid (Daxad 27), and the resulting mixture ballmilled together to produce a composition containing 4000 parts by weight of the cyanopyridyl phosphorus compound employed, 300 parts by weight of Nacconol NR and 300 parts by weight of Daxad 27, per million parts of ultimate composition.

In this procedure, there are prepared aqueous compositions from each of

O-(5-cyano-2-pyridyl) O,O-diethyl phosphorothioate;
O-(2-cyano-3-pyridyl) O,O-diethyl phosphorothioate;
O-(6-cyano-3-pyridyl) O-isobutyl ethylphosphoramidate;
O-(3-cyano-2-pyridyl) O-n-butyl diethyl-phosphoramidate;
O-(4-cyano-2-pyridyl) O-methyl di-n-butylphosphoramidothioate;
O-(5-cyano-2-pyridyl) O,O-dimethyl phosphate;
O-(6-cyano-2-pyridyl) O-n-propyl isobutylphosphoramidothioate;
O-(5-cyano-2-pyridyl) O,O-diethyl phosphate;
O-(5-cyano-2-pyridyl) O,O-dimethyl phosphorothioate;
O-(5-cyano-2-pyridyl) O-isopropyl methylphosphoramidothioate;
O-(5-cyano-2-pyridyl) O,O-di-n-propyl phosphorothioate;
O-(2-cyano-3-pyridyl) O-ethyl phosphoramidate;
O-(4-cyano-3-pyridyl) O,O-di-sec-butyl phosphate;
O-(5-cyano-3-pyridyl) O,O-dimethyl phosphorothioate;
O-(5-cyano-2-pyridyl) O-methyl methylphosphoramidothioate;
O-(6-cyano-3,5-dichloro-2-pyridyl) O,O-diethyl phosphorothioate;
O-(5-cyano-3-chloro-2-pyridyl) O,O-diethyl phosphorothioate;
O-(5-cyano-2-bromo-3-pyridyl) O-isopropyl methylphosphoramidate;
O-(3-cyanao-5-chloro-4-pyridyl) O-n-butyl O-methyl phosphorothioate;
O-(3-cyano-5-bromo-2-pyridyl) O,O-di-sec-butyl phosphate;
O-(5-cyano-3-chloro-2-pyridyl) O-n-propyl sec-butylphosphoramidothioate;
O-(2-cyano-6-bromo-3-pyridyl) O-methyl phosphoramidate;
O-(5-cyano-3,6-dichloro-2-pyridyl) O,O-diethyl phosphorothioate;
O-(5-cyano-3,4,6-trichloro-2-pyridyl) O,O-dimethyl phosphate;
O-(5-cyano-2,4,6-tribromo-3-pyridyl) O,O-dimethyl phosphorothioate; and
O-(5-cyano-3,6-dibromo-2-pyridyl) O,O-diethyl phosphorothioate.

Compositions prepared according to these procedures of Example 5 can be employed as treating compositions or can be diluted with additional quantities of water to prepare aqueous treating compositions of lesser concentrations.

Example 6

The cyanopyridyl phosphorus compounds of the present invention can also be employed to prepare aerosol compositions which are particularly effective for localized control of pest organisms in and around houses, barns, warehouses, and the like.

In representative operations, an aerosol formulation containing 1 percent of one of the cyanopyridyl phosphorus compounds, 51 percent of a petroleum distillate, and 48 percent of dichlorodifluoromethane is prepared by dispersing the cyanopyridyl phosphorus compound in the petroleum distillate and placing the resulting dispersion and liquid dichlorodifluoromethane within a closed cylinder provided with an orifice, opening of which is controlled by a valve operable from the exterior of the cylinder. In this manner, aerosol formulations are prepared with each of the following compounds:

O-(5-cyano-2-pyridyl) O,O-diethyl phosphorothioate;
O-(2-cyano-3-pyridyl) O,O-diethyl phosphorothioate;
O-(6-cyano-3-pyridyl) O-isobutyl ethylphosphoramidate;
O-(3-cyano-2-pyridyl) O-n-butyl diethylphosphoramidate;
O-(4-cyano-2-pyridyl) O-methyl di-n-butylphosphoramidothioate;
O-(5-cyano-2-pyridyl) O,O-dimethyl phosphate;
O-(6-cyano-2-pyridyl) O-n-propyl isobutylphosphoramidothioate;
O-(5-cyano-2-pyridyl) O,O-diethyl phosphate;
O-(5-cyano-2-pyridyl) O,O-dimethyl phosphorothioate;
O-(5-cyano-2-pyridyl) O-isopropyl methylphosphoramidothioate;
O-(5-cyano-2-pyridyl) O,O-di-n-propyl phosphorothioate;
O-(2-cyano-3-pyridyl) O-ethyl phosphoramidate;
O-(4-cyano-3-pyridyl) O,O-di-sec-butyl phosphate;
O-(5-cyano-3-pyridyl) O,O-dimethyl phosphorothioate;
O-(5-cyano-2-pyridyl) O-methyl methylphosphoramidothioate;
O-(6-cyano-3,5-dichloro-2-pyridyl) O,O-diethyl phosphorothioate;
O-(5-cyano-3-chloro-2-pyridyl) O,O-diethyl phosphorothioate;
O-(5-cyano-2-bromo-3-pyridyl) O-isopropyl methylphosphoramidate;
O-(3-cyano-5-chloro-4-pyridyl) O-n-butyl O-methyl phosphorothioate;
O-(3-cyano-5-bromo-2-pyridyl) O,O-di-sec-butyl phosphate;
O-(5-cyano-3-chloro-2-pyridyl) O-n-propyl sec-butylphosphoramidothioate;
O-(2-cyano-6-bromo-3-pyridyl) O-methyl phosphoramidate;
O-(5-cyano-3,6-dichloro-2-pyridyl) O,O-diethyl phosphorothioate;
O-(5-cyano-3,4,6-trichloro-2-pyridyl) O,O-dimethyl phosphate;
O-(5-cyano-2,4,6-tribromo-3-pyridyl) O,O-dimethyl phosphorothioate; and
O-(5-cyano-3,6-dibromo-2-pyridyl) O,O-diethyl phosphorothioate.

These compositions are particularly adapted to be employed as aerosol compositions for the control of crawling insects, such as roaches, silverfish, ants, spiders, and the like.

Example 7

An aqueous treating composition containing 100 parts of O-(2-cyano-3-pyridyl) O,O-diethyl phosphorothioate per million parts by weight of ultimate aqueous treating composition is prepared according to the procedures of Example 4. This aqueous treating composition is employed for the control of Mexican bean beetles, (*Epilachna varivestis*), in the third instar stage, on cranberry bean plants. The cranberry bean plants are wetted briefly with the aqueous treating composition, the wetted plants permitted to dry, and the dried plants placed within a confined area and caused to be infested with a known number of Mexican bean bettles. Thereafter, the infested plants are held under good agricultural conditions for a period of several days. At the end of this period, the cranberry bean plants are examined and it is found that there is obtained a complete kill of the Mexican bean beetles.

Example 8

An aqueous treating composition containing 500 parts of O-(2-cyano-3-pyridyl) O,O-diethyl phosphorothioate per million parts by weight of ultimate aqueous treating composition is prepared according to the procedures of Example 4. A quantity of fruit and a known number of plum curculio adults feeding thereon are wetted briefly with this aqueous treating composition; thereafter, the treated fruit and curculio adults are permitted to dry and are held for about 6 days under conditions conducive to the growth and well-being of plum curculio adults. At the end of the 6 day period, the fruit is examined to determine the percent mortality of plum curculio adults, and it is found that there has been obtained a 100 percent kill and control of plum curculio adults.

Example 9

An aqueous treating composition containing 100 parts of O-(5-cyano-2-pyridyl) O,O-dimethyl phosphorothioate per million parts by weight of ultimate aqueous treating composition is prepared according to the procedures of Example 4. Houseflies (*Musca domestica*) are uniformly wetted briefly with this aqueous treating composition and thereafter observed for mortality for 72 hours. It is found that treatment of the houseflies in this manner with the subject compound results in a 100 percent kill of houseflies.

Example 10

Essentially the same results as in Example 9 are obtained when O-(5-cyano-3-chloro-2-pyridyl) O,O-diethyl phosphorothioate is employed in the procedures of Example 9.

Example 11

O-(5-cyano-2-pyridyl) O,O-diethyl phosphorothioate is dispersed in acetone and the resulting dispersion spread onto a ground pyrophyllite-aluminum silicate solid material to prepare a dust composition containing 2 percent of the subject compound. This dust composition is spread on the horizontal floor surface of an enclosed cockroach cage container to provide 2.0 milligrams of the subject compound per square foot of the surface. The sides of the container are greased to prevent cockroaches from avoiding contact with the subject compound. Thereafter, a known number of American cockroaches (*Periplaneta americana*) are introduced into the container and the container held in an environment conducive to the life processes of the cockroaches. Following the introduction of the cockroaches, the container and the cockroaches placed therein are observed closely and continuously to determine the percent of early knock-down of the cockroaches. For the purposes of the evaluation, the inability to locomote one full body length with coordination is considered to constitute knock-down. It is found that there is a knock-down of 95 percent of the cockroaches 36 minutes following the introduction of the cockroaches into the treated container.

Example 12

In procedures essentially the same as those employed in Example 11, except that there is utilized a dust composition containing 0.5 percent of O-(5-cyano-2-pyridyl) O,O-diethyl phosphorothioate, the subject compound is evaluated for the percent mortality of American cockroaches. This dust is spread on the floor surface to provide 0.5 milligram of the compound per square foot of surface. In this evaluation, following the introduction of the cockroaches into the treated container, the container and cockroaches are held under conditions favorable to the growth and life processes of cockroaches, and periodic observations made, for 24 hours. At the end of the 24 hour period, there is found a complete kill and control of American cockroaches.

Example 13

An aqueous compostion containing as sole active ingredient O-(5-cyano-2-pyridyl) O-isopropyl methylphosphoramidothioate is prepared according to the procedures of Example 4. The aqueous treating composition is applied to three fir plywood panels, evenly on both sides, at the rate of 40 milligrams of the subject compound per square foot of surface area of the panels. Immediately thereafter, each of the three panels is introduced into a separate screened cage; in the first cage there are placed a known number of houseflies (*Musca domestica*); in the second cage there are placed a known number of American cockroaches (*Periplaneta americana*); and in the third cage, there are placed a known number of German cockroaches (*Blattella germanica*). Thereafter, the screened cages are held under conditions favorable to the growth and well-being of the insect organisms for a period of 24 hours. At the end of this period, the cages are examined and there is found a complete kill and control of each of the subject organisms. 6 days later (a week following treatment of the plywood panels), new populations of known numbers of the three subject organisms are again placed, separately, one in each of the screened cages, to obtain a reinfestation, and the cages examined 24 hours later to determine the residual effect of the treatment upon the subject organisms. Subsequently, reinfestations are made two weeks following treatment, 4 weeks following treatment, and every 4 weeks thereafter for a period of time representing about 6 months following treatment. 24 hours following each reinfestation, the screened cages are examined and in each instance throughout the 6-month period, there is found to be a complete kill and control of the subject organisms.

Example 14

An aerosol is prepared, according to the procedures of Example 6, containing O-(5-cyano - 2 - pyridyl) O,O-dimethyl phosphate as sole active agent. This aerosol is employed for the control of a very heavy infestation of silverfish (*Lepisma saccharina*) in the basement of a house of natural stone, in which basement are stored books, clothing, and the like. The aerosol spray is directed at the basement walls and floor and, in particular, into all crevices of the walls and floor, so that all sprayed surfaces are covered with a light but even deposit of the spray, representing about 10 milligrams per square foot. A period of about one day is permitted to pass and the basement then examined for the presence of silverfish. None are found. The spraying with the aerosol is repeated and the basement examined 24 hours after the repeated spraying. The area is closely examined a week later and no silverfish are found.

Example 15

An aerosol is prepared which contains O-(5-cyano-2-pyridyl) O,O-dimethyl phosphorothioate as sole toxicant, according to the procedures of Example 6 except that the propellant comprises 80 percent of the total aerosol, the toxicant, 1 percent, and the petroleum distillate, 19 percent. This aerosol is employed, in late May, as a space spray for the control of spiders in a semi-enclosed laundry building at a summer camp in the north temperate zone. Visible webs are first mechanically removed, by handbrooms, and then the aerosol is directed, in particular, at the upper portions of the room, the ceiling, dark lower portions, and the interior of a storage closet attached thereto. After a week, the treated area is examined: substantial numbers of dead spiders found throughout, and no new webs or live spiders are found.

Example 16

In other operations, a formulation prepared according to the procedures of Example 5 and containing 50 parts of O - (5 - cyano - 2 - pyridyl) O,O-diethyl phosphate as sole active agent per million parts by weight of ultimate formulation is employed for the control of fiddler crabs.

A coastal dike of earth, of which the thickness of a narrow section at high tide level is variously from 1 to 3 feet, serving as a barrier to exclude incoming sea tides of brackish water, is infested with large natural populations of fiddler crabs (not specifically identified but believed to be mostly *Uca minax*). The crabs' burrows into the dike constitute a source of leakage of the brackish water beyond the dike and threaten a general weakening of the dike structure.

The formulation is applied to the infested dike wall at low tide, in an amount sufficient to thoroughly drench the dike surfaces. Shortly after departure of the person making application, the crabs begin to emerge from burrows into the dike; repeatedly, as individual fiddler crabs emerge, it is observed that each becomes inactivated. An examination is made at low tide on the third day thereafter, and no fiddler crabs are seen.

Example 17

A composition is prepared according to the procedures of Example 5 and containing 500 parts of O - (5 - cyano-2-pyridyl) O - methyl methylphosphoramidothioate as sole toxicant per million parts by weight of ultimate treating composition. Cranberry bean plants heavily infested with two-spotted spider mites in the egg and adult stages are wetted briefly with this treating composition, the treated plants permitted to dry, and the treated and dried plants held under favorable agricultural conditions for a period of about 5 days. At the end of this period, the plants are examined to ascertain the percent kill and control of two-spotted spider mites in the adult stage, and to ascertain the percent kill and control of two-spotted spider mites in the egg stage. It is found that there is a 100 percent kill of the two-spotted spider mites in the adult stage, and an essentially complete kill and control of two-spotted spider mites in the egg stage.

Example 18

Essentially the same results as in Example 16 are obtained when employing O - (5 - cyano - 3 - chloro - 2-pyridyl) O,O - diethyl phosphorothioate as sole toxicant in the procedures of Example 16.

Example 19

An aerosol is prepared, according to the procedures of Example 6, containing O-(5-cyano-2-pyridyl) O,O-diethyl phosphorothioate as sole toxicant. This aerosol is employed for the control of a heavy infestation of centipedes (*Scolopendra morsitans*) in a package-wrapping area at the rear of a commercial warehouse in the southeastern United States. Loose contents are removed, and the area superficially cleaned. During this clean-up, approximately 25 centipedes of lengths from 2 to 6 inches are noticed. The said spray is directed at the walls of the area and in and around facilities located in the area, so that all sprayed surfaces are covered with a light but even deposit of the spray, representing about 25 milligrams of the compound per square foot. On the second day after this initial spraying, the spraying with the aerosol is repeated. On the fifth day after the initial spraying, the area is closely examined and no centipedes are found.

The O-loweralkyl phosphoramidochloridates and phosphoramidochloridothioates employed as starting materials in accordance with the teachings of the present application are prepared by reacting two molecular proportions of a suitable amine with one molecular proportion of an O-loweralkyl phosphorodichloridate or phosphorodichloridothioate at a temperature of from —10 to 50° C. Upon completion of the reaction, the desired product is separated by conventional methods.

The O,O-diloweralkyl phosphorochloridates and O,O-diloweralkyl phosphorochloridothioates, employed as starting materials as described herein, are prepared in known procedures by reacting phosphorous oxychloride or phosphorus thiochloride with an alkyl metal alcoholate to introduce two alkoxy groups into the molecule. Where it is desired to produce the mixed diester, the phosphorus oxychloride or phosphorus thiochloride is successively reacted with different alcoholates. Good results are obtained when employing stoichiometric amounts of the reagents and operating at temperatures at which chloride of reaction is formed. Following the reaction, the desired products are separated by known procedures.

The O-lower alkyl phosphorodichloridates or phosphorodichloridothioates are prepared by reacting a molecular excess of phosphoryl oxychloride or phosphoryl thiochloride with a suitable loweralcohol. Good results are obtained when operating at temperatures of from 20° to 100° C., and employing from 4 to 10 moles of phosphoryl compound with one mole of loweralcohol.

The alkali metal and tertiary amine salts of the cyanopyridinol, which salts are employed as starting materials for the compounds of the present invention, are prepared in known procedures from the corresponding cyanopyridinol compounds. The alkali metal salts are prepared by reacting the corresponding cyanopyridinol compounds with a base, which can be an alkali metal hydroxide or carbonate. The tertiary amine salts are prepared by reacting together the corresponding cyanopyridinol compounds with the desired tertiary amine. These reactions to prepare the salts are preferably carried out in an inert liquid reaction medium.

The said alkali metal and tertiary amine salts are conveniently employed in situ; in such procedures, the desired salt, in the reaction medium in which prepared, is reacted with the phosphorochloridate or phosphorochloridothioate as hereinbefore taught. In other procedures, the cyanopyridyl phosphorus compounds of the present invention are prepared by reacting together the cyanopyridinol compound, the base or tertiary amine, and the phosphorochloridate or phosphorochloridothioate; in these procedures, the same reaction conditions taught hereinabove for the reaction of the said alkali metal or tertiary amine salt with phosphorochloridate or phosphorochloridothioate are employed.

The cyanopyridinol compounds are also prepared in known procedures; in these procedures, a cyano moiety is introduced onto the nucleus of a pyridinol compound. See pp. 230–232 of Pyridine and Derivatives, part three, edited by Klingsberg (Interscience Publishers, New York, 1962). In preparing cyanopyridinol compounds, good results are generally obtained when employing the procedure wherein a nuclear halogen atom on a halopyridinol is replaced, or one of a plurality of nuclear halogen atoms on a polyhalopyridinol is selectively replaced, with a cyano group. The halopyridinols are prepared by the known processes of hydrolysis and halogenation as set forth at Rec. Trav. Chem., at 69, 684–699 and 1281–1288 (1950); and 74, 59 (1955); and at J. Chem. Soc. 83,400. See also Pyridine and Its Derivatives, op. cit., pp. 571–582. In an alternative method, a cyanopyridinol wherein $n=0$ is prepared according to the known procedures for introduction of a cyano moiety onto the nucleus of a pyridinol compound, and the said cyanopyridinol is thereafter halogenated. This halogenation is accomplished by the known halogenation processes referred to above for the halogenation of pyridinols to prepare halopyridinols.

I claim:
1. Compound of the formula

$$N\equiv C-\underset{X_n}{\underset{|}{\bigcirc}}-O-P\underset{R'}{\overset{Z}{\overset{\|}{<}}}R$$

wherein Z represents a member selected from the group consisting of oxygen and sulfur; X represents a member selected from the group consisting of bromo and chloro; R represents loweralkoxy; R' represents a member selected from the group consisting of loweralkoxy, amino, and loweralkylamino; and $n$ represents an integer of from 0 to 3, both inclusive.

2. O-(5-cyano-2-pyridyl) O,O-diethyl phosphorothioate.
3. O-(5-cyano-2-pyridyl) O,O-dimethyl phosphate.
4. O-(2-cyano-3-pyridyl) O,O-diethyl phosphorothioate.
5. O-(5-cyano-2-pyridyl) O,O-dimethyl phosphorothioate.
6. O-(5-cyano-2-pyridyl) O,O-diethyl phosphate.
7. O-(6-cyano-3-pyridyl) O-isobutyl ethylphosphoramidate.
8. O-(5-cyano-3-chloro-2-pyridyl) O,O-diethyl phosphorothioate.
9. O-(2-cyano-4-pyridyl) O-ethyl O-methyl phosphate.

References Cited

UNITED STATES PATENTS 2,881,201   5/1959   Schrader _____ 260—461

FOREIGN PATENTS 3,813,079   7/1963   Japan.

OTHER REFERENCES

Derwent Japanese Patents Report, vol. 2, No. 29 (1963) pp. 7–8, General Organic 13,079/63 For. Pat. Jrl.

JOHN D. RANDOLPH, *Primary Examiner.*

A. L. ROTMAN, *Assistant Examiner.*